C. C. STUTZ.
TILE.
APPLICATION FILED MAR. 21, 1910.

1,003,820.

Patented Sept. 19, 1911.

WITNESSES
R A Balderson
Walter Jamarise

INVENTOR
C. C. Stutz
by Bakewell, Byrnes & Parmelee,
his Attys.

UNITED STATES PATENT OFFICE.

CHARLES C. STUTZ, OF PLAINFIELD, NEW JERSEY, ASSIGNOR TO AMERICAN CEMENT TILE MANUFACTURING COMPANY, OF WAMPUM, PENNSYLVANIA, A CORPORATION OF PENNSYLVANIA.

TILE.

1,003,820.   Specification of Letters Patent.   Patented Sept. 19, 1911.

Application filed March 21, 1910. Serial No. 550,580.

*To all whom it may concern:*

Be it known that I, CHARLES C. STUTZ, of Plainfield, Union county, New Jersey, have invented a new and useful Improvement in Tiles, of which the following is a full, clear, and exact description, reference being had to the accompanying drawings, forming part of this specification, in which—

Figure 1:
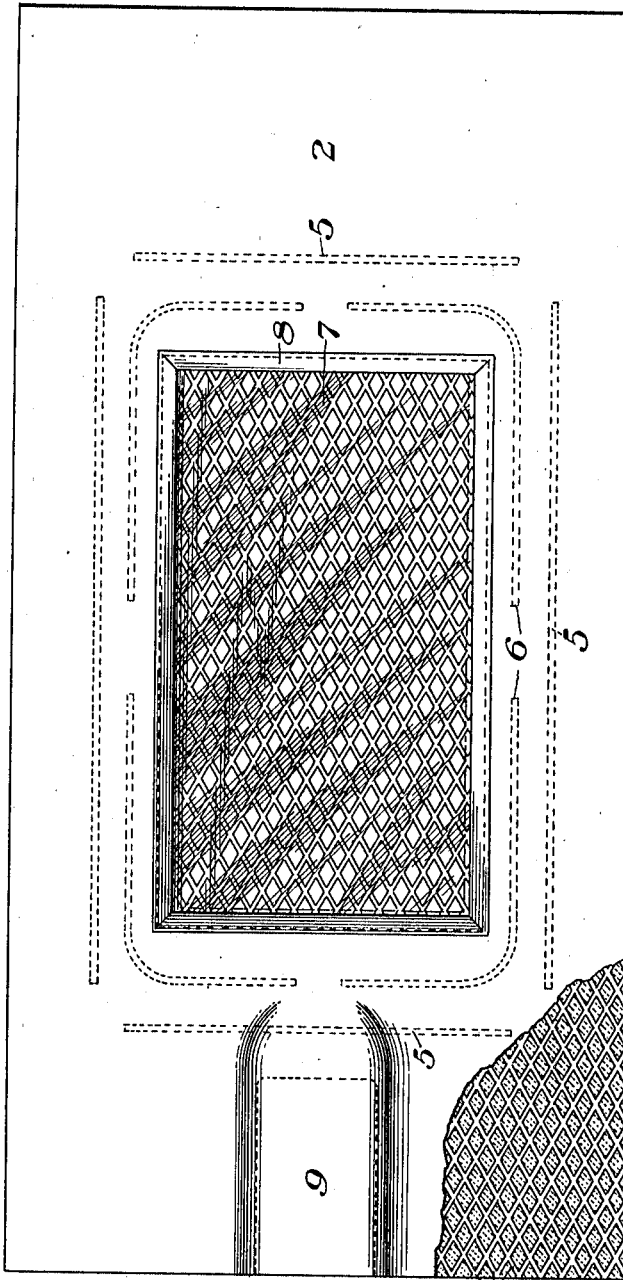
Figure 2:
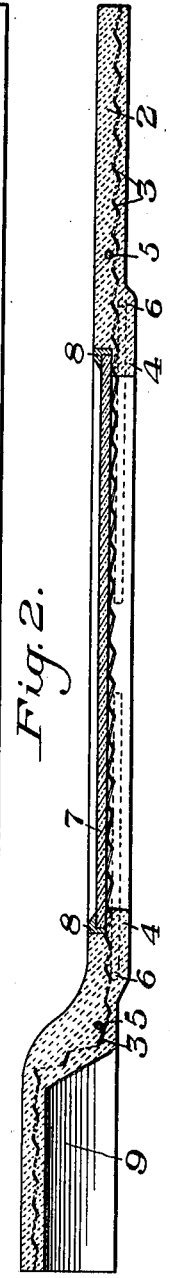

Figure 1 is a plan view of my improved tile partly broken away; and Fig. 2 is a central longitudinal section of the same.

My invention relates to that class of tiles which contain plates of glass or translucent material.

The object of my invention is to prevent cracking or breaking of the tile between the opening for the glass and the sides thereof. Tiles of this character which have heretofore been made, were considerably weaker than a solid tile, due to the elimination of the cement and reinforcing material at the center of the tile to provide an opening for the reception of the light pane.

Another object of the invention is to provide a tile of this character in which a plain pane of glass may be used, and which will be held in place to the same extent as a pane of wire glass if it should become broken or cracked.

The precise nature of my invention will be best understood by reference to the accompanying drawings, it being understood, however, that various changes may be made in the details of construction and arrangement of the parts without departing from my invention as defined in the appended claims.

In the drawings 2 represents the tile, which may be of clay or any suitable material, and which is preferably formed about a reinforcing fabric 3 of expanded metal, wire mesh or similar material extending throughout the entire body of the tile and over the opening therein. The central portion of the tile is left open and is provided with a bead 4 along the four sides of the opening, this bead preferably containing metal strengthening strips. I have shown two series of these rods, the outer ones 5 are preferably straight and extend substantially parallel with the edges of the opening. The inner set of wires 6 are preferably bent around the corners of the opening; both sets being embedded in the tile material. Around the opening the tile is recessed to form a ledge, this ledge preferably being of greater dimensions than the sheet of glass to be inserted. The glass, which may be plain or wire glass, as shown at 7, is laid on the ledge, and is secured within the opening by surrounding cement or holding material 8, which is preferably somewhat elastic, to allow expansion and contraction. I have shown the tile as provided with a raised channel or rib portion 9 in one end portion thereof, this also containing expanded metal or reinforcing mesh; but the shape and size of the tile is not material in my broad invention.

The advantages of my invention result from use of an open mesh reinforce throughout the major portion of the body of the tile and across the opening therein, which will greatly strengthen the tile, and also form a support for the glass if it should be broken when in position on the roof.

These tiles can be made, shipped to the place they are to be used, and placed in position before the glass is inserted, and thereby overcome the large percentage of broken light panes and tiles.

Heretofore in tiles of this character the open mesh reinforcing material only extended throughout the body of the tile and not across the opening therein, and in order to stiffen the tile for shipment and handling it was necessary to insert the plate of glass, which was frequently broken and consequently the tile was broken due to the breaking of this support.

I claim.

1. As a new article of manufacture, a tile having a rectangular opening, a translucent plate secured therein, the tile containing an open mesh reinforcing sheet throughout the entire portion of the tile and across the opening for the translucent plate; substantially as described.

2. As a new article of manufacture, a tile having an opening, a plate of translucent material secured therein, the tile containing an open mesh reinforcing sheet extending across the opening and into the tile, said reinforcing sheet being arranged to support the translucent plate; substantially as described.

3. As a new article of manufacture, a tile having an opening, a plate of translucent material secured therein, the tile containing an open mesh reinforcing sheet throughout a portion of the tile and across the opening for the translucent plate; substantially as described.

In testimony whereof, I have hereunto set my hand.

CHARLES C. STUTZ.

Witnesses:
 JESSE B. HELLER,
 H. M. CORWIN.

Copies of this patent may be obtained for five cents each, by addressing the "Commissioner of Patents, Washington, D. C."